May 31, 1949.　　　W. B. CLIFFORD　　　2,471,725
MIXING VALVE

Filed Aug. 7, 1946　　　3 Sheets-Sheet 1

INVENTOR
Walter B. Clifford.
BY
Munday & Witter
Attys.

May 31, 1949.  W. B. CLIFFORD  2,471,725
MIXING VALVE
Filed Aug. 7, 1946  3 Sheets-Sheet 2

INVENTOR.
Walter B. Clifford.
BY
Hemway & Witter
Attys.

May 31, 1949.　　　　W. B. CLIFFORD　　　　2,471,725
MIXING VALVE
Filed Aug. 7, 1946　　　　　　　　　　　　　3 Sheets-Sheet 3
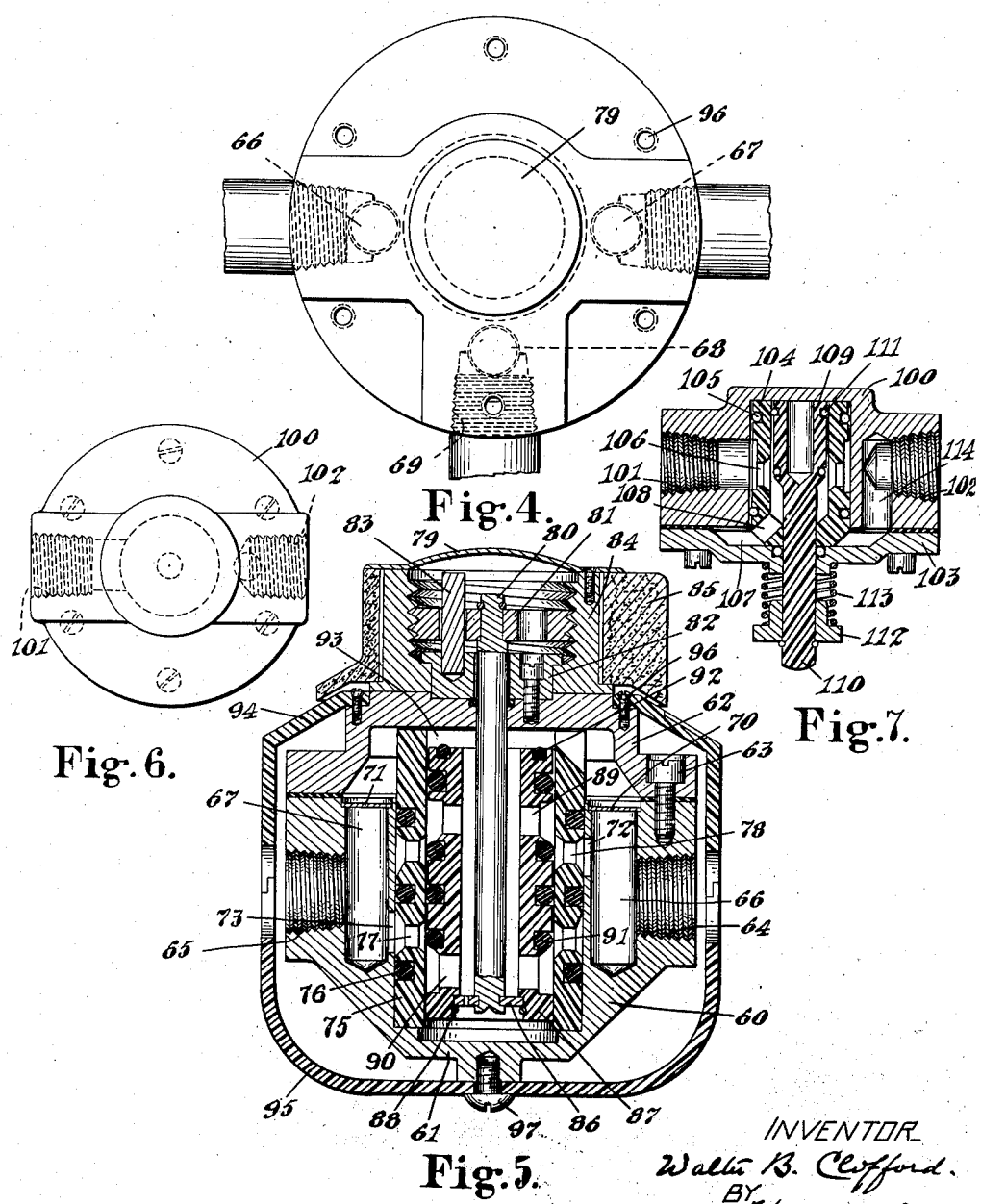

Patented May 31, 1949

2,471,725

UNITED STATES PATENT OFFICE 2,471,725

MIXING VALVE

Walter B. Clifford, Boston, Mass.

Application August 7, 1946, Serial No. 689,038

5 Claims. (Cl. 251—75)

This invention comprises a new and improved mixing valve having features of construction which render it inexpensive to manufacture as well as durable and reliable in operation.

The valve of my invention comprises a hollow body containing an annular cylindrical wall having spaced ports opening therein, an inner sleeve movable to open and close the ports, and O-ring packing sealing the sleeve to the cylindrical wall between its said ports. It is believed that O-ring packing has not been employed heretofore in valve constructions in the novel manner herein disclosed. I have discovered, however, that its use results in several important advantages. In the first place, it permits a comfortable and convenient tolerance in manufacturing the interfitting parts of the valve, thus substantially reducing expense in that respect. It substantially increases the wearing characteristics and life of the valve and obviates the danger of scoring. It also permits the employment of synthetic resins such as Bakelite in the interior of the valve, thus eliminating or largely reducing corrosion of the valve parts and preventing the accumulation of scale and other deposits from the fluid passing through the valve.

These and other features of my invention will be best understood and appreciated from the following description of a preferred embodiment thereof, selected for purposes of illustration and shown in the accompanying drawings, in which:

Fig. 4 is a plan view of a valve of modified construction,

Fig. 5 is a corresponding view in longitudinal section,

Fig. 6 is a plan view of another modification of the valve of my invention, and

Fig. 7 is a corresponding view in longitudinal section.

Figure 1:
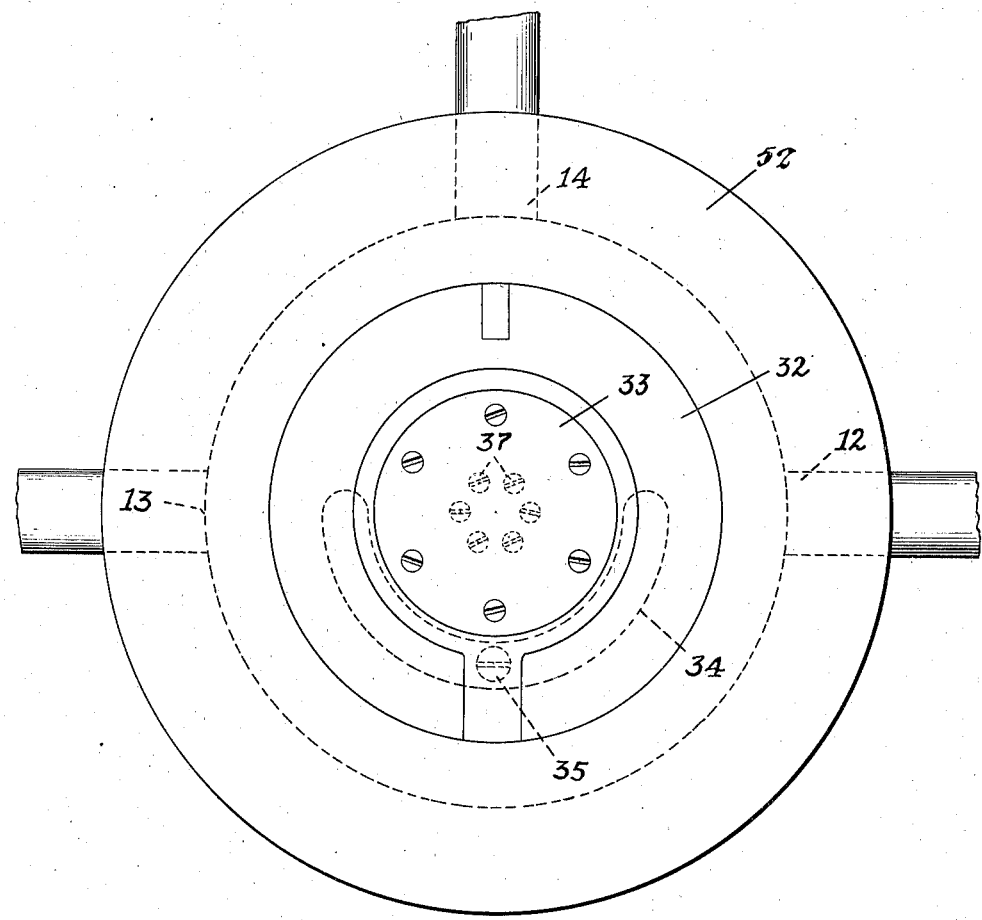
Fig. 1 is a plan view of the valve.

The valve is illustrated in the drawings on a somewhat enlarged scale and as embodied in a thermostatically controlled valve, but it will be understood that the valve may be manufactured in any convenient size for its intended use and may be operated manually or by pressure and not necessarily thermostatically.

The valve comprises a hollow body 10, which may be of bronze or any other metal, generally cylindrical in shape, having a bottom 11 and containing a cylindrical chamber. In describing the illustrated valve it will be assumed that it is intended for mixing hot and cold water for the purpose of delivering a stream at automatically controlled temperature, but as already noted the valve may be employed for mixing any two fluids.

The valve body is provided at one side with a threaded hot water inlet 12, at the other side with a cold water inlet 13, and at substantially 90° from these inlets with a threaded outlet 14 for the mixture. The valve body is flanged and closed by a circular cover 15 which is bolted to the flange of the body. Within the wall of the valve body adjacent to and intersected by the cold water inlet is a vertical bore 16 open at its lower end into a mixing space provided by the lower portion of the valve chamber. The upper end of the bore 16 is closed by a circular cover piece 17. At the other side of the casing is provided a vertical bore 18 adjacent to and intersected by the hot water inlet. The upper end of the bore is closed by a plug 19 and below the plug is provided a check valve 20 held on its seat by a compression spring. The bore 18 communicates with an annular space in the valve cylinder which is intersected by a plurality of vertical passages leading to the mixing space 50 between the bottom 11 of the valve chamber and the internal parts of the valve. The check valve 20 is for the purpose of preventing recirculation of hot water through the valve.

In the inner wall of the valve chamber is provided a cold water port 21 arranged circumferentially opposite the cold water inlet 13, and a hot water port 22 similarly arranged opposite the hot water inlet 12. The inner wall of the valve chamber is lined with a stationary sleeve 23 of Bakelite or other resinous material held in place between the bottom 11 of the valve chamber and a split ring 28 removably fitting a circumferential groove in the inner wall of the valve chamber. It is provided with three circumferential grooves in each of which is placed an O-ring packing 24. These, as shown, seal the sleeve 23 to the inner wall of the valve chamber in zones at the top, at the bottom, and in mid position in the sleeve. The lower and intermediate rings are located above and below the cold water inlet port 21, and the upper and intermediate rings are located above and below the hot water inlet port 22. The sleeve 23 is provided with a shallow circumferential channel in which is formed a series of circular ports 26 and an upper channel in which is formed a series of similar ports 27. In both channels is inserted a wire mesh filter screen 25 which serves to prevent any sediment carried by either the hot or cold water inlet streams from reaching the interior of the valve.

Figure 2:
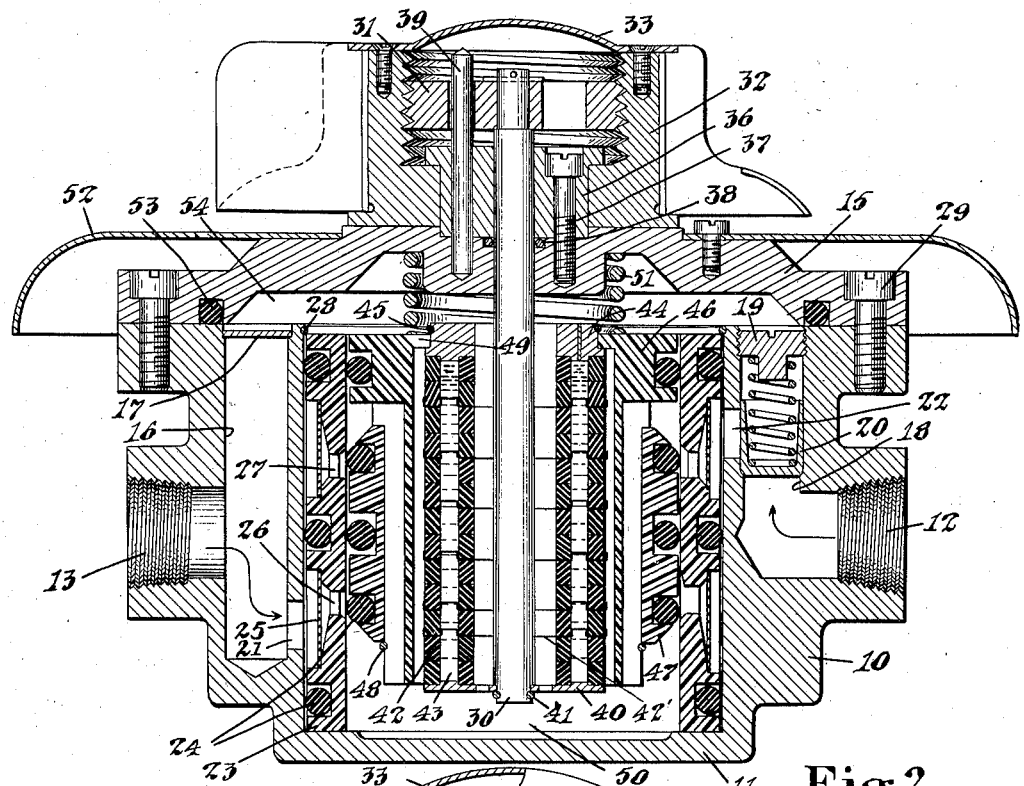
Fig. 2 is a view of the valve in longitudinal section.

The O-rings 24 have not been heretofore used in mixing valves and they constitute an important feature of my invention. They have been developed in connection with aircraft equipment under Army-Navy specification AN–HH–P–114b, and are made preferably of an oil-resistant synthetic rubber having a hardness of about 75 (Shore durometer), tensile strength 1000 lbs. per sq. in., elongation 20–50%, specific gravity approximately 2. O-rings are commercially available in accordance with Army-Navy Aeronautical Design Standard AND 10073 in OD sizes $\frac{3}{8}$ in. to 4 in. with cross-sectional diameters of $\frac{3}{32}$ in. to $\frac{3}{16}$ in. These rings may be successfully used to give satifactory non-leaking running seals at all temperatures ranging from −65 to 160° F. and at operating pressures as high as 3000 lbs. per sq. in. They may be used individually as shown in Fig. 2, or in combination with anti-extrusion rings of softer material such as leather or the like. In the valve of my invention O-rings of this type are employed to form seals between the stationary sleeve 23 and the inner walls of the valve chamber and to form running seals between the inner wall of the stationary sleeve 23 and the movable sleeve 47 which is effective to control the opening and closing of the ports 26 and 27 as will presently be described.

The movable elements of the valve are carried by a central rod or shaft 30 pinned at its upper end to a threaded disk 31. The disk 31 has threaded connection with a recessed head 32 closed by a detachable cover plate 33. The head 32 is circular in contour and provided in its lower face with a segmental slot 34 into which projects the head of a stationary screw 35 set in the cover 15 of the valve body. The slot 34 in cooperation with the stop screw limits the movement of the head 32 to turning 90° in either direction from its initial position as will be apparent from an inspection of Fig. 1.

The head 32 is held in place by a flanged plug 36 fastened to the cover 15 of the valve by six screws 37 and engaging with its flange a shoulder in the recess of the head. Rotation of the threaded disk 31 is prevented by a stationary pin 39 which is fast in the cover 15 of the valve body and projects upwardly through the plug 36 and the disk 31. It will be apparent, therefore, that when the head 32 is rotated, the disk 31 and the shaft 30 are raised or lowered without rotary movement.

At its lower end the rod 30 carries a perforated disk 40 which is held in place by a split ring 41. Above the disk is supported a thermostatic element which is made up of a series of concentrically arranged neoprene rings 42 having interlocking joints and forming between them an annular chamber 43 which may be filled with ether or other liquid having a high expansion factor. A metal collar 44 disposed concentrically with the neoprene rings closes the chamber 43, and in this ring may be formed a filling passage which is closed by a taper pin after the chamber 43 has been filled. Perforated retaining disks 42' are interposed between certain of the rings 42 for the purpose of holding the column in shape.

Fastened to the metal ring 44 is a metal or Bakelite sleeve 46 having a heavy circumferential flange at its upper end and below this flange a body in which are formed longitudinal channels, grooves or flutes opening at their lower ends into the mixing space 50. The sleeve 46 is secured to the ring 44 by a split locking ring 45. Its internal diameter is greater than the external diameter of the column formed by the rings 42 and an annular passage is thus formed which opens through a circular row of perforations 49 into mixing space 54 in the top of the valve. In the flange of the sleeve 46 is provided a circumferential groove for an O-ring which supplies a running seal between the flange 46 and the Bakelite lining sleeve 23.

The fluted body of the sleeve 46 is shouldered to receive a Bakelite valve sleeve 47 held in place by a split locking ring 48 and having three circumferential grooves in each of which is placed an O-ring acting to make running seals with the Bakelite lining sleeve 23. The intermediate O-ring is located between the row of cold water inlet ports 26 and the row of hot water inlet ports 27. Normally the valve sleeve 47 is so located that both sets of ports are open as shown in Fig. 2. It will be apparent that downward movement of the sleeve 47 will tend to close the cold water ports 26 and open the hot water ports 27 and vice versa.

A compression spring 51 is interposed between the top of the sleeve 46 and the cover of the valve, the cover being recessed to receive the spring and having a boss to center it. The cover 15 is sealed to the body of the valve by an O-ring 53 and is shaped to provide a mixing space 54 which is in communication with the lower mixing space 50 through the annular space which is provided between the rod 30 and the inner walls of the annular cylinder formed by the neoprene rings 42 and the outer annular passage leading to the perforations 49.

Figure 3:
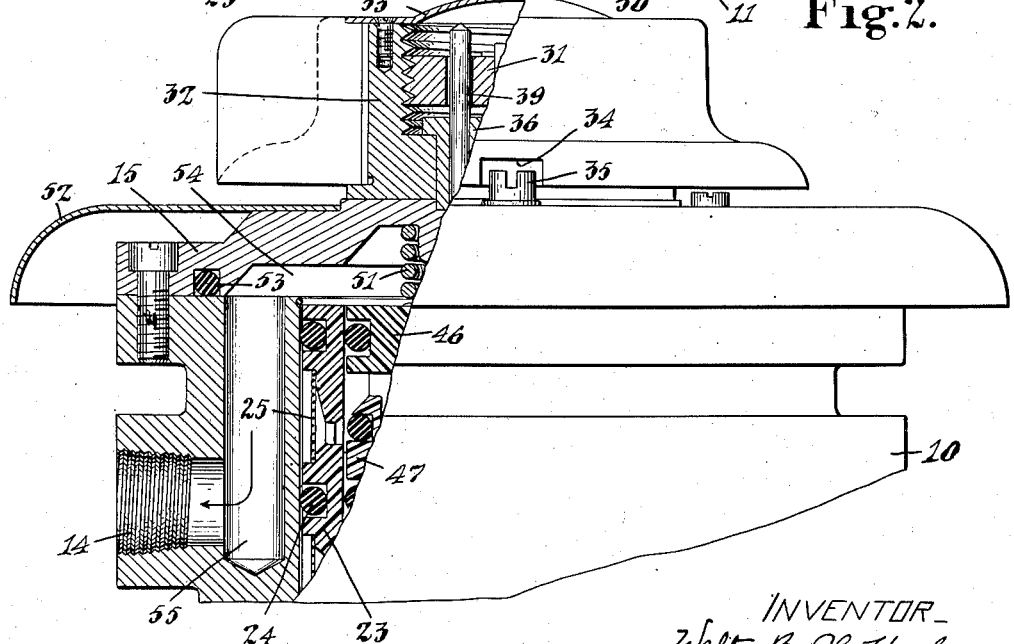
Fig. 3 is a partial section taken at right angles to that shown in Fig. 2.

Fig. 3 shows the valve body in section on a plane at right angles to that shown in Fig. 2. Accordingly the vertical outlet bore 55 is disposed 90° circumferentially from each of the threaded inlets 12 and 13. It opens directly at its upper end into the mixing space 54 provided beneath the cover of the valve and affords free passage of the liquid from this space to the outlet 14.

The operation of the valve will be apparent from the foregoing description but may be briefly summarized as follows. Cold water entering the inlet 13 passes through the bore 16, the port 21 in the valve body, the row of ports 26 in the lining sleeve and reaches the space 50 through the flutes or grooves of the sleeve 46. Similarly hot water enters the inlet 12 passing through the bore 18, lifting the valve 20, passing through the port 22 in the valve body and the row of ports 27 in the lining sleeve 23. From these it reaches the grooves in the sleeve 46 and passes downwardly into the space 50 where it is mixed with the cold water as already explained. The mixture now passes upwardly through the annular passage surrounding the rod 30 and the annular passage outside the thermostatic element into the space 54, then downwardly in the bore 55 to the outlet 14. In a thermostatic valve of the character herein shown the temperature of the mixture is controlled by the up and down movement of the valve sleeve 47 actuated by the cubical expansion or contraction of the liquid in the annular chamber provided by the neoprene rings 42. Sufficient pressure is exerted by a spring 51 to overcome vapor pressure of the filling medium at operating temperatures and thus insure the operation by liquid expansion only, avoiding erratic action due to changes in pressure of liquids to be mixed that occurs if vapor pressure is present. Regulation by the thermostatic element is controlled by turning the head 32 which of course shifts the initial position of the whole element.

It will be understood that my invention is not limited to a valve construction including a thermostatic element but that if desired, the valve sleeve 47 may be raised or lowered by mechanically operated means alone or any other convenient means adapted to the installation in which the valve is to be used. A valve of that type is shown in Figs. 4 and 5. It comprises a hollow valve body 60 having a flat bottom 61 and being closed by a cover 62 secured by screws 63 to the body of the valve. In the valve body is formed a threaded hot water inlet 64 and a similar cold water inlet 65. The hot water inlet 64 leads to a vertical bore 66 closed at its upper end by a sealing plate 70 and the cold water inlet 65 leads to a vertical bore 67 closed at its upper end by a sealing plate 71. The vertical bores 66 and 67 are formed in the solid material of the valve body at its opposite sides. A third vertical bore 68 located 90° between the other two communicates with a mixture outlet 69 as indicated in Fig. 6. The hot water vertical bore 66 opens inwardly through a port 72, and the cold water bore 67 opens inwardly through a port 73.

The valve chamber is lined by a stationary sleeve 75 of Bakelite. This sleeve is seated between a shoulder formed in the bottom 61 of the valve body and the cover 62. It is provided with three external circumferential grooves in which are located O-rings 76 which seal the lining sleeve to the inner wall of the valve chamber in zones above and below and between the rows of ports 77 and 78.

The cover 62 is perforated for the passage of a valve rod 80 which is shouldered and secured by a locking ring to a threaded nut 81. To the cover 62 is secured by screws a flanged plug 82 which is also perforated so that the valve rod may pass freely through it and is provided with a recess for a pin 83 which extends freely through the nut 81 and holds it against rotation while permitting it to move up and down. An internally threaded head 84 having a plastic shell 85 contains the nut 81 and is closed by a cover plate 79. It will be apparent that by turning the head 84 the valve rod 80 may be raised and lowered.

At its lower end the valve rod 80 is connected through a perforated disk 86 to a valve sleeve 87 which is also preferably formed of Bakelite and provided with four circumferential grooves in which are placed O-rings 91 forming running seals between the valve sleeve 87 and the stationary lining sleeve 75. The valve sleeve is spaced from the valve rod 80 so that it provides a vertical annular passage connecting a mixing space provided in the valve above the bottom 61 and a mixing space 93 provided beneath the cover 62. The valve sleeve 87 is provided with a series of radial hot water ports 89 and a corresponding series of cold water ports 90 located adjacent to the corresponding ports in the lining sleeve 75. In its upper face the valve sleeve is provided with an annular groove containing an O-ring 92. When the valve stem is raised, this O-ring is brought into sealing contact with the inner face of the cover 62 thus closing the valve.

The valve body is entirely enclosed in a plastic shell which may be formed in two sections of any desired color or pattern. The upper section 94 is fitted to a shoulder formed in the cover 62 and secured in place by screws 96. The lower section 95, which makes interlocking connection with the upper section, is secured in place by a single screw 97 threaded into a boss which projects from the bottom of the valve body.

The valve is illustrated in open position in Fig. 5, hot water entering the inlet 64, passing through the bore 66, the port 72 and the circle of ports 78 which, as shown, are formed in a circumferential recess in the lining sleeve 75. The hot water then passes through the port 89 and upwardly to the mixing space 93. Cold water enters the inlet 65 and passes through the bore 67, the port 73, the circumferential row of ports 77, and the ports 90 in the valve sleeve, thus reaching the annular passage leading to the mixing space 93. The mixture thus made passes downwardly through the bore 68 and out through the outlet 69. When the head 84 is turned to lift the valve sleeve 87, the O-ring 92 is effective to seal the annular passage from the outlet bore 68.

In Figs. 6 and 7 my invention is illustrated as embodied in a spring operated valve such as might be used in a refrigerating system. This valve comprises a hollow valve body 100 having a threaded inlet 101 and a threaded outlet 102 and containing a valve chamber closed by a cover 103 which is secured to the valve body. The valve chamber is lined by a Bakelite sleeve 104 sealed to the inner wall of the valve body by O-rings 105 contained in circumferential grooves in the sleeve. The sleeve is provided with circumferential grooves and a row of inlet ports 106. At its lower end, as shown in Fig. 7, the sleeve 104 is tapered and engages the cover 103 forming an annular space 107 to which leads a passage 108. The valve itself comprises a cylindrical body 109 and a stem 110 which extends outwardly from the cover 103. The valve is shouldered to fit the lower end of a lining sleeve 104 and circumferentially grooved to receive O-rings 111 which act to form running seals between the body of the valve and the lining sleeve 104. At its outer end the valve stem is provided with a head 112 between which and the cover 103 is confined a compression spring 113. As shown in Fig. 7 the valve is open and fluid entering the inlet 101 flows through the port 106 in the lining sleeve to the annular space about the valve stem, through the passage 108 to the annular space 107, and thence to a vertical bore 114 which leads to the outlet 102. The valve remains in this position only when the head 112 is depressed against the action of the spring 113. When the spring is permitted to act, the valve body moves downwardly sealing the inlet from communication with the interior of the valve.

It will be noted that in all three illustrated constructions the movable parts of the valve are balanced so that very little force is required to effect the opening and closing movement of the valve. This, of course, is an important advantage where the valve is to be automatically or thermostatically controlled.

Having thus disclosed my invention and described in detail three illustrative embodiments thereof, I claim as new and desire to secure by Letters Patent:

1. A mixing valve comprising a hollow valve body, a resinous lining sleeve sealed to the interior of the valve body and having ports therein, a valve sleeve carrying O-rings which make running seals between the lining sleeve and the valve sleeve adjacent to the said ports, and a longitudinally fluted sleeve carrying said valve sleeve, being movable therewith and providing a longitudinal fluid passage from one end of the valve body to the other.

2. A mixing valve comprising a hollow valve body having a resinous lining sleeve provided with inlet ports, a longitudinally fluted sleeve movably mounted within the valve body and forming therewith mixing spaces at the top and bottom of the valve, a resinous valve sleeve carried by the fluted sleeve and controlling said inlet ports, and O-rings providing running seals between the two resinous sleeves adjacent to said ports.

3. A mixing valve comprising a valve body shaped to present a central cylindrical valve chamber and having three longitudinal bores formed in its wall communicating with transverse inlets and an outlet respectively, the said inlet bores having ports leading to the valve chamber, and means providing communication between said valve chamber and the outlet bore, an externally grooved sleeve movably mounted in said valve chamber, a circumferentially grooved valve sleeve carried thereby, and O-rings in the circumferential grooves of the valve sleeve providing running seals adjacent to said ports.

4. A balanced valve comprising a valve body shaped to present a cylindrical chamber having inlet and outlet openings, a resinous lining sleeve fitted within the chamber, O-rings sealing the sleeve to the wall of the chamber on both sides of the inlet, a resinous valve sleeve movable within the lining sleeve, a grooved sleeve movably mounted in the valve chamber and carrying the said valve sleeve, and O-rings carried by the valve sleeve and forming running seals with the lining sleeve.

5. A mixing valve comprising a valve body shaped to present a central cylindrical valve chamber and having three longitudinal bores formed in its wall communicating with transverse inlets and an outlet respectively, the said inlet bores having ports leading to the valve chamber, and means providing communication between said valve chamber and the outlet bore, a valve rod centrally disposed and movably mounted in the valve chamber, a perforated disk fast to the lower end of the rod, a circumferentially grooved valve sleeve carried thereby, and O-rings in the circumferential grooves of the valve sleeve providing running seals adjacent to said ports.

WALTER B. CLIFFORD.

REFERENCES CITED

The following references are of record in the file of this patent:

UNITED STATES PATENTS

| Number | Name | Date |
|---|---|---|
| Re. 19,488 | Russell | Mar. 5, 1935 |
| 394,475 | Dwyer | Dec. 11, 1888 |
| 1,244,184 | Dunwoodie | Oct. 23, 1917 |
| 1,611,650 | Lawler | Dec. 21, 1926 |
| 1,925,109 | Olson | Sept. 5, 1933 |
| 2,199,129 | Hamilton | Apr. 30, 1940 |
| 2,314,683 | Berry | Mar. 23, 1943 |
| 2,354,255 | Gillum | July 25, 1944 |
| 2,360,839 | Barksdale | Oct. 24, 1944 |
| 2,396,643 | DeGanahl | Mar. 19, 1946 |
| 2,417,242 | Eckel | Mar. 11, 1947 |

FOREIGN PATENTS

| Number | Country | Date |
|---|---|---|
| 209,415 | Switzerland | Apr. 15, 1940 |
| 540,779 | Great Britain | 1941 |